US008931914B2

(12) United States Patent
Kim et al.

(10) Patent No.: US 8,931,914 B2

(45) Date of Patent: Jan. 13, 2015

(54) FLEXIBLE SOLAR LIGHT LAMP DEVICE

(71) Applicants: Ji Yong Kim, Hawaiian Gardens, CA (US); Man Duck Kim, Hawaiian Gardens, CA (US); Chung Han Kim, Corona, CA (US)

(72) Inventors: Ji Yong Kim, Hawaiian Gardens, CA (US); Man Duck Kim, Hawaiian Gardens, CA (US); Chung Han Kim, Corona, CA (US)

( * ) Notice: Subject to any disclaimer, the term of this patent is extended or adjusted under 35 U.S.C. 154(b) by 59 days.

(21) Appl. No.: 13/854,851

(22) Filed: Apr. 1, 2013

(65) Prior Publication Data

US 2014/0293591 A1 Oct. 2, 2014

(51) Int. Cl.

| | |
|---|---|
| ***F21L 4/00*** | (2006.01) |
| ***H04M 1/22*** | (2006.01) |
| ***F21V 21/32*** | (2006.01) |
| ***F21V 21/096*** | (2006.01) |

(52) U.S. Cl.

CPC ............ *F21V 21/32* (2013.01); *F21V 21/0965* (2013.01)

USPC ............ 362/183; 362/157; 362/191; 362/190

(58) Field of Classification Search

None

See application file for complete search history.

(56) References Cited

U.S. PATENT DOCUMENTS

| | | | | |
|---|---|---|---|---|
| 8,029,154 | B2 * | 10/2011 | Myer | 362/145 |
| 2008/0186699 | A1 * | 8/2008 | Saez et al. | 362/191 |
| 2009/0040750 | A1 * | 2/2009 | Myer | 362/183 |
| 2012/0020060 | A1 * | 1/2012 | Myer et al. | 362/183 |
| 2013/0063963 | A1 * | 3/2013 | Riesebosch | 362/555 |
| 2013/0148339 | A1 * | 6/2013 | Noble | 362/184 |

* cited by examiner

*Primary Examiner* — Natalie Walford

(74) *Attorney, Agent, or Firm* — John K. Park; Park Law Firm

(57) ABSTRACT

A flexible solar light includes a lamp portion, a main body portion, and a goose neck portion. The goose neck portion connects the lamp portion and the main body portion, which is flexible and configured to be bent in a shape and maintains the bent shape. The lamp portion and the main body portion are configured to form a portable flashlight, a light stand, a wall lamp, or a ceiling lamp by engaging or separating each other.

17 Claims, 9 Drawing Sheets

FLEXIBLE SOLAR LIGHT LAMP DEVICE

BACKGROUND OF THE INVENTION

The present invention relates to a flexible solar light. More particularly, this invention relates to a flexible solar light, which can be accommodated to different situation of usage.

A regular flashlight is very limited in usage due to its simple structure. Therefore, sometimes it is very challenging to use it in some situations.

For example, it must be held with a hand all the time in order to direct the light beam. Even though it can be put on a horizontal surface, it stays there until the user picks it up or re-orients its beam in a new direction.

These difficulties are unavoidable because the conventional flashlight is provided in a big chunk.

Accordingly, a need for a flexible solar light has been present for a long time considering the expansive demands in the everyday life.

This invention is directed to solve these problems and satisfy the long-felt need.

SUMMARY OF THE INVENTION

The present invention contrives to solve the disadvantages of the prior art.

An object of the invention is to provide a flexible solar light, which can be attached to different surfaces.

Another object of the invention is to provide flexible solar light, which still functions as a regular flashlight.

An aspect of the invention provides a flexible solar light, comprising a lamp portion, a main body portion, and a goose neck portion.

The lamp portion includes a lamp mount, a lamp installed at a front end of the lamp mount, and a first fastener installed at a rear end of the lamp mount.

The main body portion includes a power supply, a controller, and a second fastener installed at a front end thereof, and the second fastener is configured to engage the first fastener detachably.

The goose neck portion is configured for connecting the lamp portion and the main body portion, wherein the goose neck portion is flexible and configured to be bent in a shape and maintains the bent shape under an external force, the magnitude of which being below a predetermined value.

The lamp portion and the main body portion are configured to form a portable flashlight by engaging each other through the first and second fasteners.

The lamp portion and the main body portion are configured to form a light stand by separating from each other and standing on the main body portion.

The lamp portion and the main body portion are configured to form a wall lamp by separating from each other and attaching the second fastener of the main body portion to a wall.

The lamp portion and the main body portion are configured to form a ceiling lamp by separating each other and attaching the second fastener of the main body portion to a ceiling.

The goose neck portion may be attached to the lamp portion at a side of the lamp mount.

The goose neck portion may be attached to the main body portion at a rear end of the main body portion.

The goose neck portion may be configured to bend into a curved shape.

The goose neck portion may be configured to bend into an L-shape.

The goose neck portion may be configured to bend into a multiple-bent shape.

The goose neck portion may be configured to bend into an S-shape.

The first fastener may comprise one or more magnets, and the second fastener may comprise one or more ferromagnetic metal.

Alternatively, the second fastener may comprise one or more magnets, and the first fastener may comprise one or more ferromagnetic metal.

The flexible solar light may further comprise a docking case including a third fastener on a top surface thereof configured for receiving and holding the second fastener of the main body.

The third fastener may comprise one or more magnets.

The docking case may comprise a fourth fastener on a bottom surface thereof, configured to attach the docking case to an external surface.

The docking case may further comprise a charging device configured for charging the power supply in the main body portion.

The charging device may comprise a solar panel and the power supply comprises a rechargeable battery.

The controller may be configured for controlling or displaying the status of the lamp and the power supply.

The lamp may comprise a plurality of light-emitting diodes (LEDs).

Each of the first and second fasteners may comprise a mechanical fastener.

The power supply may comprise a power cord and a plug that are configured for using a wall outlet directly.

The advantages of the present invention are: (1) the flexible solar light are flexible to accommodate different environments; and (2) the flexible solar light can be carried or installed conveniently.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 7:
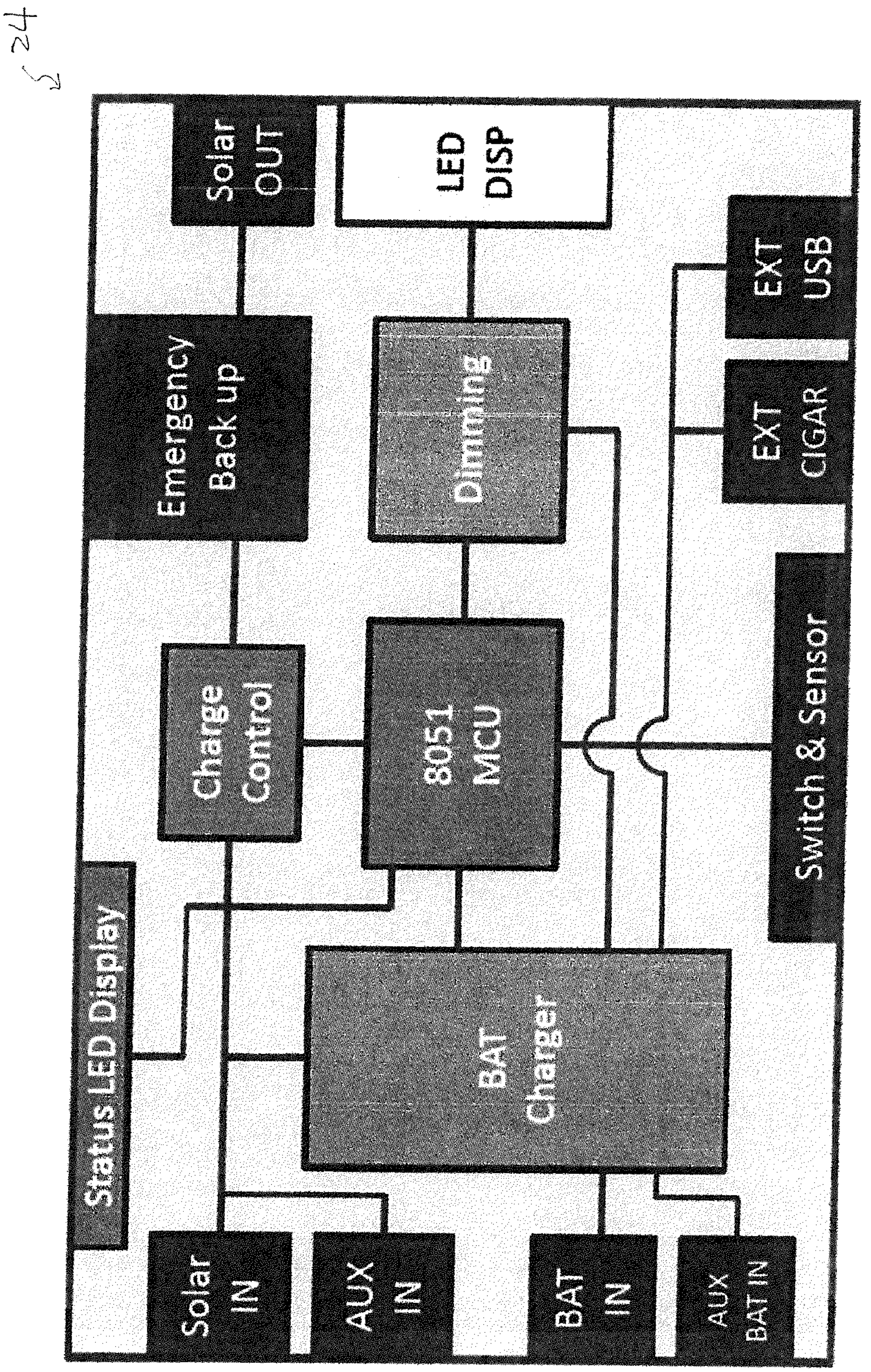
FIG. 7 is a block diagram showing a controller of a flexible solar light according to embodiments of the invention.
Figure 8:
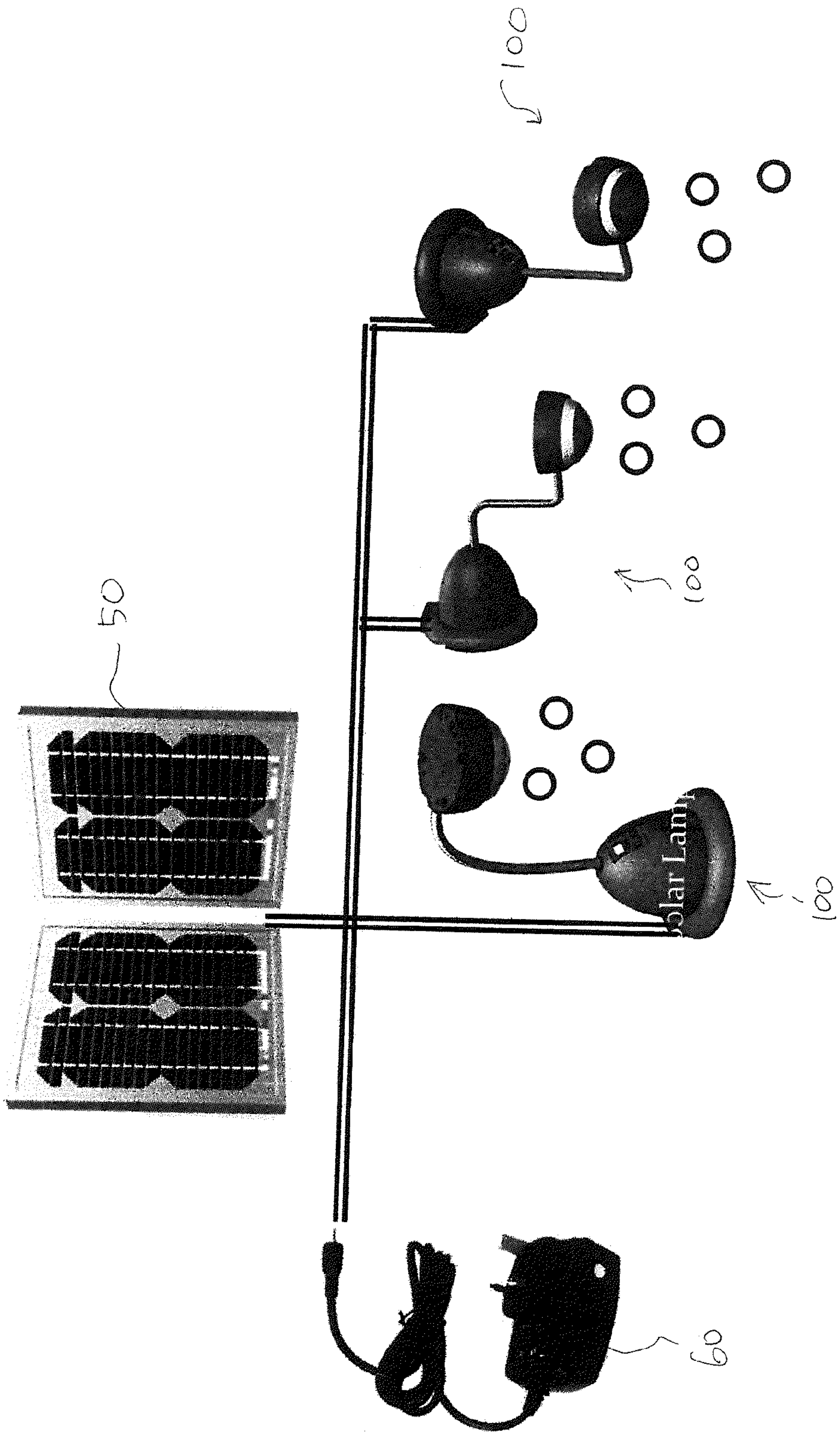
FIG. 8 is a perspective view of flexible solar lights used with power sources according to embodiments of the invention.
Figure 9:
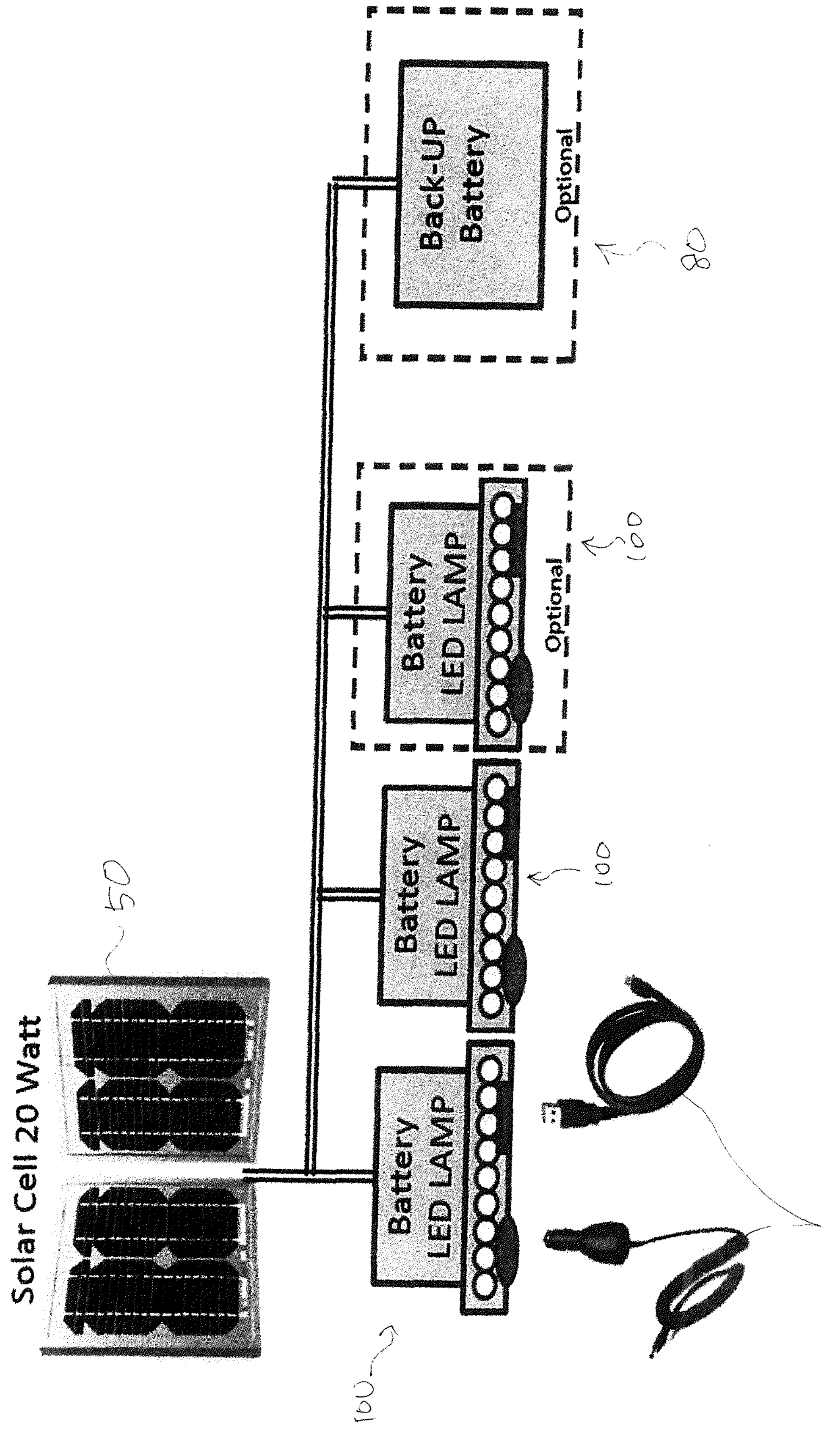
FIG. 9 is a schematic diagram of flexible solar lights used with power sources and connectors according to embodiments of the invention.

FIGS. 1-6 show flexible solar lights 100 according to an embodiment of the present invention. FIGS. 7-9 show systems for using the flexible solar lights 100.

An aspect of the invention provides the flexible solar light 100, comprising a lamp portion 10, a main body portion 20, and a goose neck portion 30.

The lamp portion 10 includes a lamp mount 12, a lamp 14 installed at a front end of the lamp mount 12, and a first fastener 16 installed at a rear end of the lamp mount 12.

The main body portion 20 includes a power supply 22, a controller 24, and a second fastener 26 installed at a front end thereof, and the second fastener 26 is configured to engage the first fastener 16 detachably.

The goose neck portion 30 is configured for connecting the lamp portion 10 and the main body portion 20, wherein the goose neck portion 30 is flexible and configured to be bent in a shape and maintains the bent shape under an external force, the magnitude of which being below a predetermined value.

Figure 4:
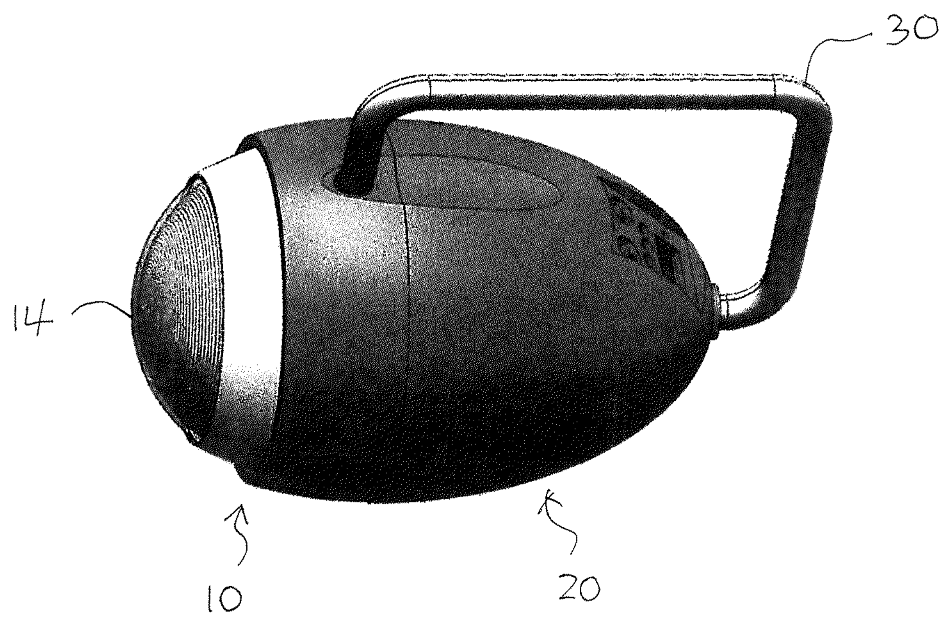
FIG. 4 is a perspective view showing a flexible solar light in a shape of a flashlight according to an embodiment of the invention.
Figure 5:
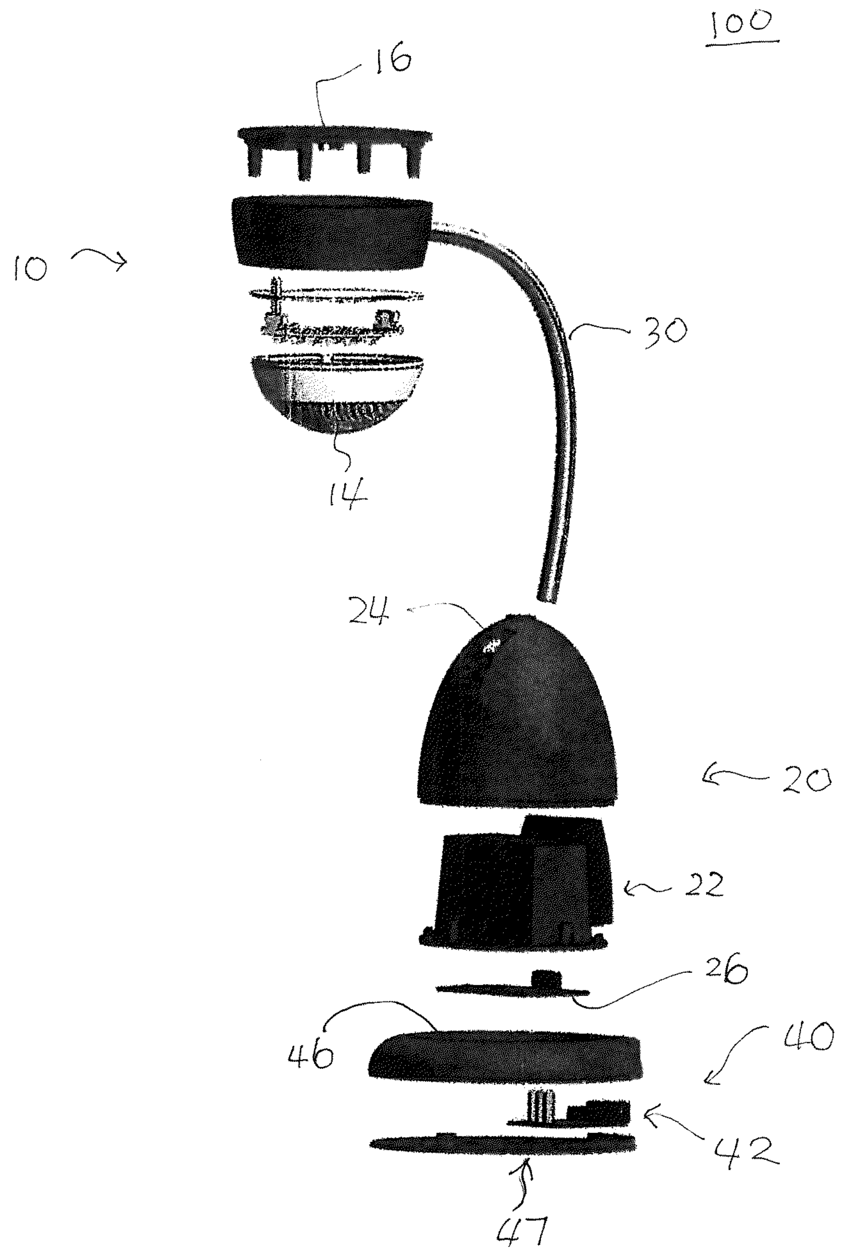
FIG. 5 is an exploded view showing a flexible solar light according to an embodiment of the invention.
Figure 6:
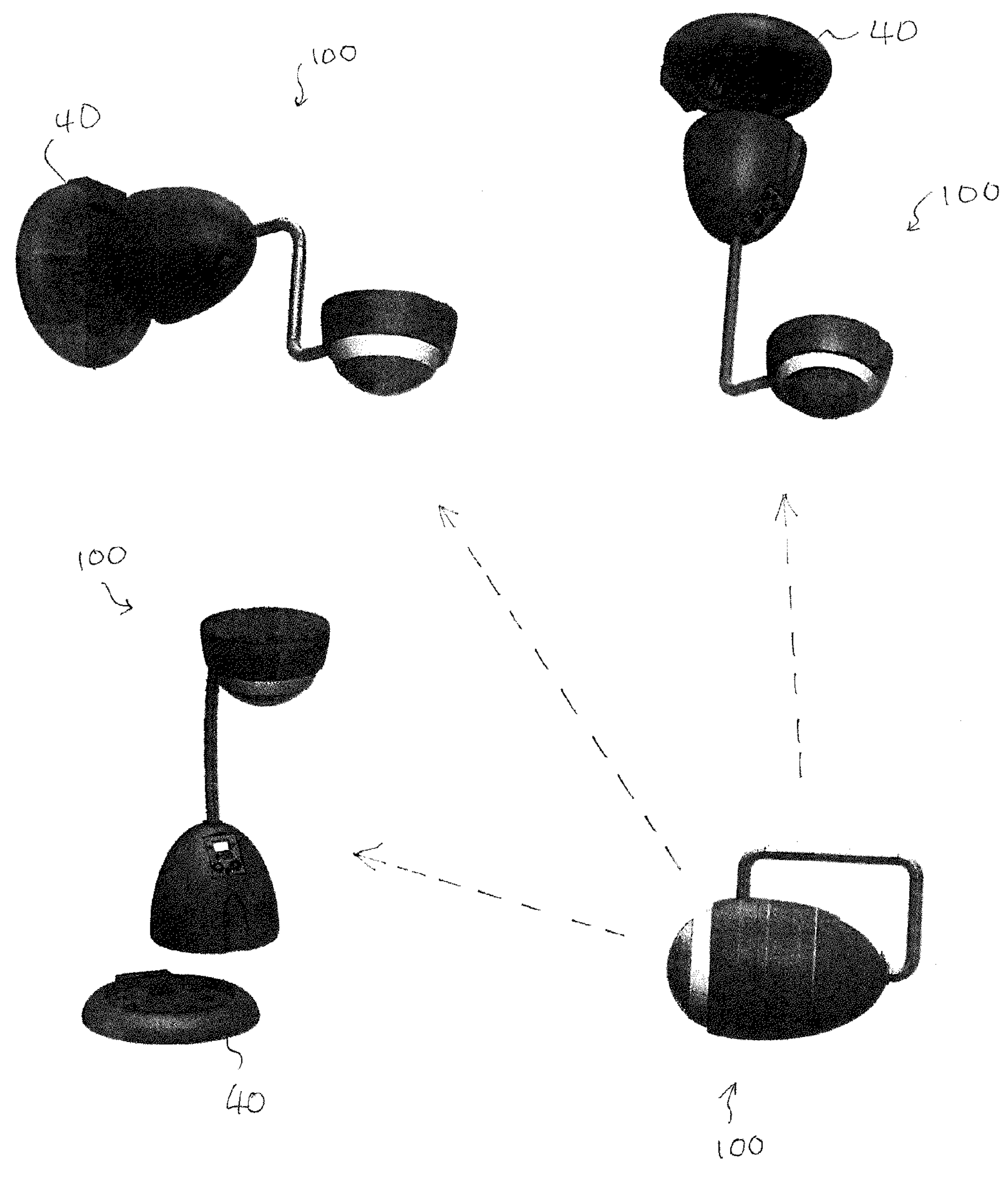
FIG. 6 is a perspective view showing four shapes of a flexible solar light according to embodiments of the invention.

The lamp portion 10 and the main body portion 30 are configured to form a portable flashlight by engaging each other through the first and second fasteners 16, 26 as shown in FIGS. 4 and 6.

Figure 1:
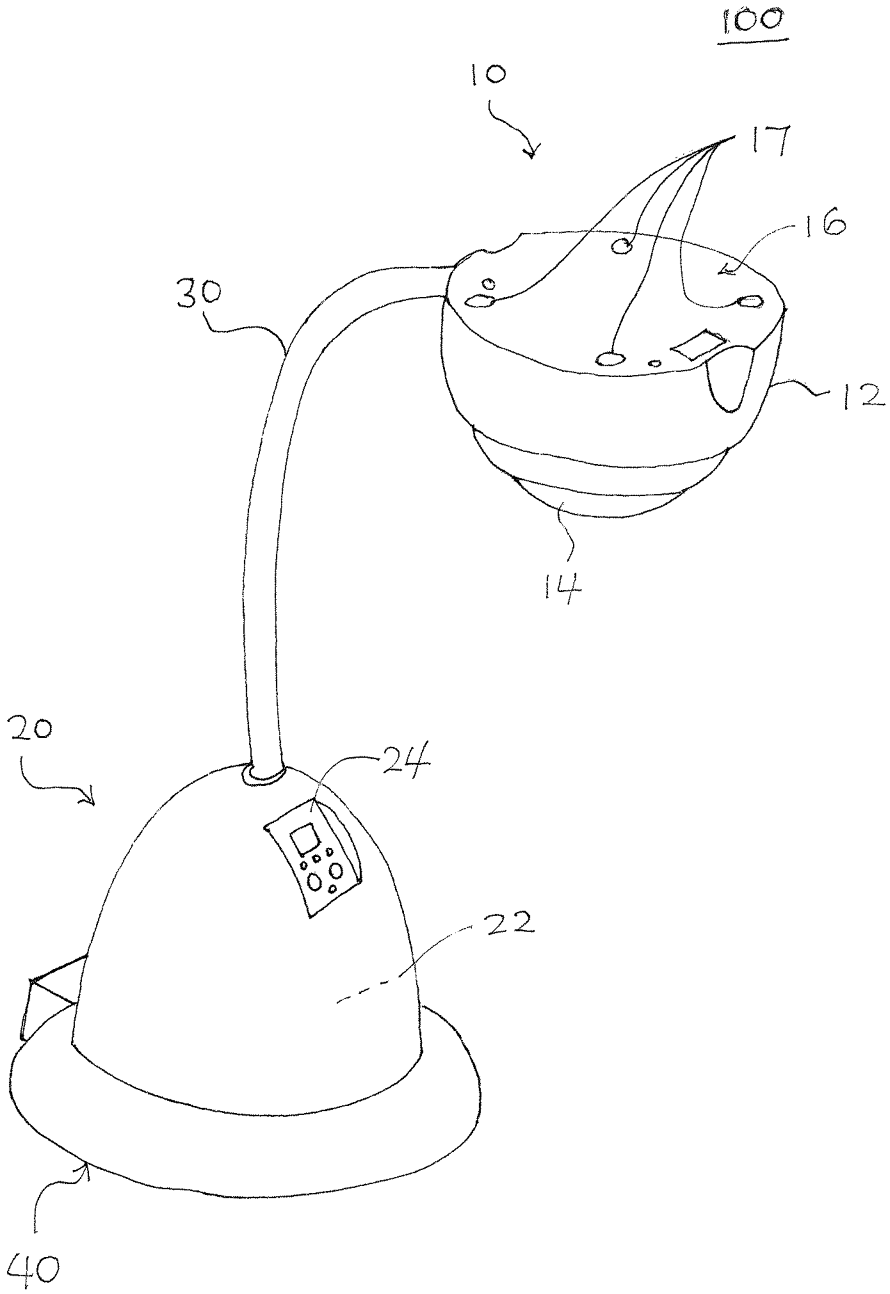
FIG. 1 is a perspective view showing a flexible solar light in a shape of a stand according to an embodiment of the invention.

The lamp portion 10 and the main body portion 20 are configured to form a light stand by separating from each other and standing on the main body portion 20 as shown in FIGS. 1 and 6.

Figure 2:
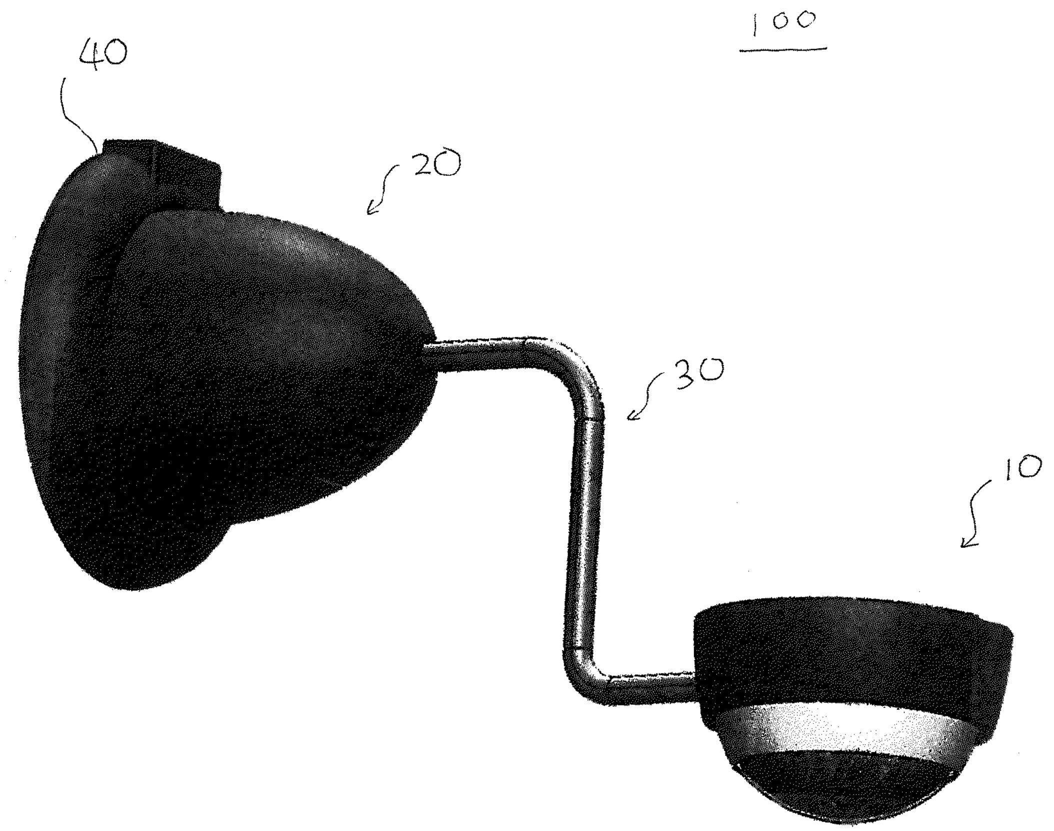
FIG. 2 is a perspective view showing a flexible solar light in a shape of a wall lamp according to an embodiment of the invention.

The lamp portion 10 and the main body portion 20 are configured to form a wall lamp by separating from each other and attaching the second fastener 26 of the main body portion 20 to a wall as shown in FIGS. 2 and 6.

Figure 3:
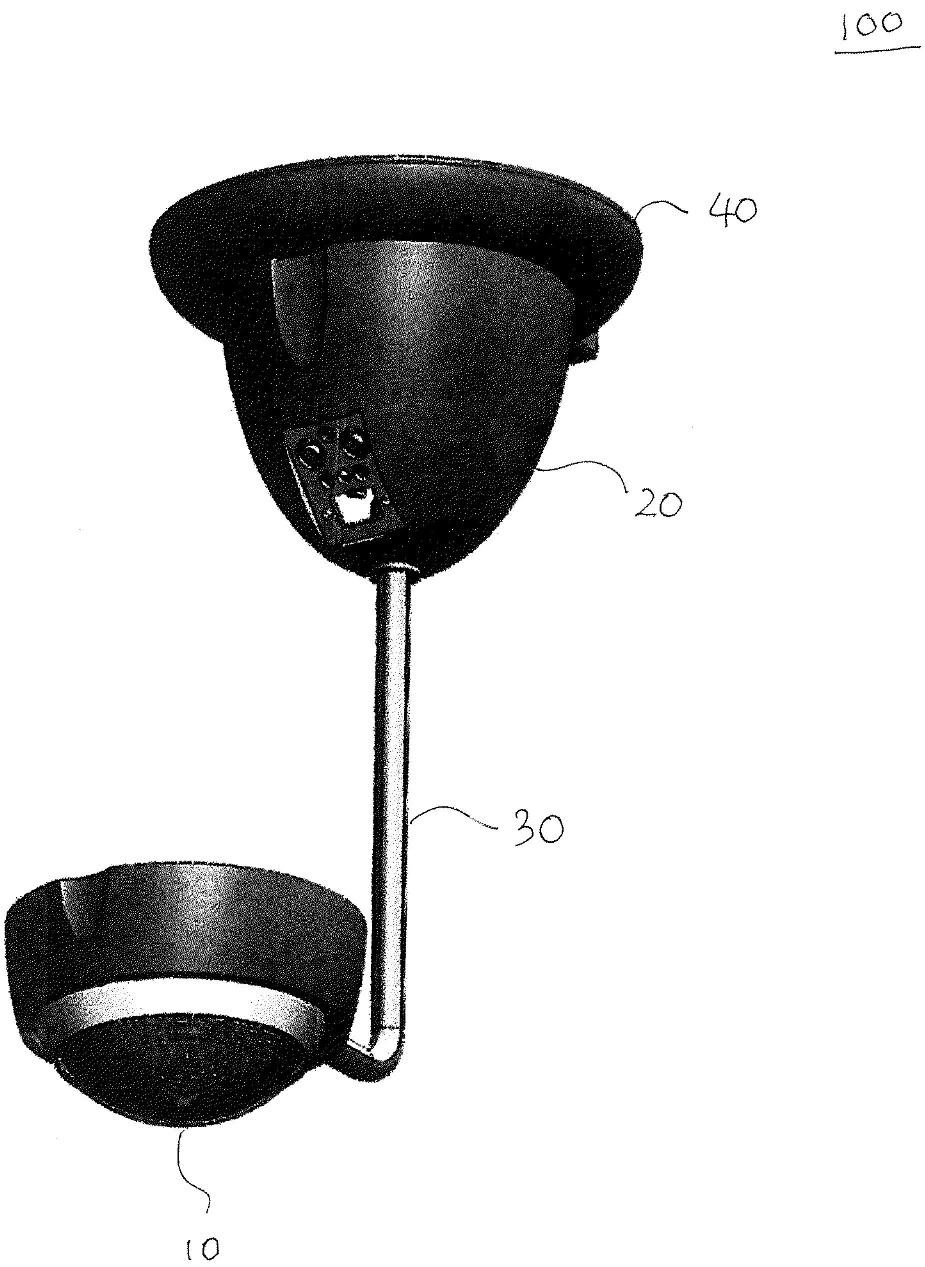
FIG. 3 is a perspective view showing a flexible solar light in a shape of a ceiling lamp according to an embodiment of the invention.

The lamp portion 10 and the main body portion 10 are configured to form a ceiling lamp by separating each other and attaching the second fastener 26 of the main body portion 20 to a ceiling as shown in FIGS. 3 and 6.

The goose neck portion 30 may be attached to the lamp portion 10 at a side of the lamp mount 12.

The goose neck portion 30 may be attached to the main body portion 20 at a rear end of the main body portion 20.

The goose neck portion 30 may be configured to bend into a curved shape as shown in FIGS. 1-4 and 6.

The goose neck portion 30 may be configured to bend into an L-shape as shown in FIG. 3.

The goose neck portion 30 may be configured to bend into a multiple-bent shape as shown in FIG. 2.

The goose neck portion 30 may be configured to bend into an S-shape, as a variation of FIG. 3.

The first fastener 16 may comprise one or more magnets 17, and the second fastener 26 may comprise one or more ferromagnetic metal (not shown).

Alternatively, the second fastener 26 may comprise one or more magnets, and the first fastener 16 may comprise one or more ferromagnetic metal.

The flexible solar light 100 may further comprise a docking case 40 including a third fastener 46 on a top surface thereof configured for receiving and holding the second fastener 26 of the main body portion 20.

The third fastener 46 may comprise one or more magnets (not shown) just like the magnets 17.

The docking case 40 may comprise a fourth fastener 47 on a bottom surface thereof, configured to attach the docking case 40 to an external surface such as a wall and a ceiling.

The docking case 40 may further comprise a charging device 42 configured for charging the power supply 22 in the main body portion 20.

The charging device 42 may comprise a solar panel 50 and the power supply 22 comprises a rechargeable battery.

The controller 24 may be configured for controlling or displaying the status of the lamp 14 and the power supply 22.

The lamp 14 may comprise a plurality of light-emitting diodes (LEDs).

Each of the first and second fasteners 16, 26 may comprise a mechanical fastener instead of magnets.

The power supply 22 may comprise a power cord and plug 60, 70 that are configured for using a wall outlet directly.

In the illustrated embodiments, the general shape of the lamp portion 10 and the main body portion 20 is cylindrical. However, in certain embodiments, they are of angular shapes with rectangular cross-section.

In certain embodiments, the surfaces on which the first and second fasteners 16, 26 may be provided with some grooves and protrusions for facilitation fastening functions.

The further details of the lamp 14, the power supply 22, the charging device 42, and the goose neck portion 30 are well known to the community, and therefore omitted here.

Also, the controller 24 shown in FIG. 7 may include a plurality of parts, but each of them are not new from the conventional ones.

In FIGS. 8 and 9, one or more flexible solar lights 100 are charged with a solar panel 50 or power from the wall outlet, or other devices such as computers through the power cord or connectors 60, 70.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A flexible solar light comprising:

a lamp portion including a lamp mount, a lamp installed at a front end of the lamp mount, and a first fastener installed at a rear end of the lamp mount;

a main body portion including a power supply, a controller, and a second fastener installed at a front end thereof, wherein the second fastener is configured to engage the first fastener detachably; and a goose neck portion configured for connecting the lamp portion and the main body portion, wherein the goose neck portion is flexible and configured to be bent in a shape and maintains the bent shape under an external force, the magnitude of which being below a predetermined value, wherein the lamp portion and the main body portion are configured to form a portable flashlight by engaging each other through the first and second fasteners, wherein the lamp portion and the main body portion are configured to form a light stand by separating from each other and standing on the main body portion, wherein the lamp portion and the main body portion are configured to form a wall lamp by separating from each other and attaching the second fastener of the main body portion to a wall, wherein the lamp portion and the main body portion are configured to form a ceiling lamp by separating each other and attaching the second fastener of the main body portion to a ceiling, and wherein the first fastener comprises one or more magnets, and the second fastener comprises one or more magnets.

2. The flexible solar light of claim 1, wherein the goose neck portion is attached to the lamp portion at a side of the lamp mount.

3. The flexible solar light of claim 2, wherein the goose neck portion is attached to the main body portion at a rear end of the main body portion.

4. The flexible solar light of claim 1, wherein the goose neck portion is configured to bend into a curved shape.

5. The flexible solar light of claim 1, wherein the goose neck portion is configured to bend into an L-shape.

6. The flexible solar light of claim 1, wherein the goose neck portion is configured to bend into a multiple-bent shape.

7. The flexible solar light of claim 1, wherein the goose neck portion is configured to bend into an S-shape.

8. The flexible solar light of claim 1, wherein the second fastener comprises one or more ferromagnetic metal.

9. The flexible solar light of claim 1, wherein the first fastener comprises one or more ferromagnetic metal.

10. A flexible solar light comprising:

a lamp portion including a lamp mount, a lamp installed at a front end of the lamp mount, and a first fastener installed at a rear end of the lamp mount;

a main body portion including a power supply, a controller, and a second fastener installed at a front end thereof, wherein the second fastener is configured to engage the first fastener detachably; and a goose neck portion configured for connecting the lamp portion and the main body portion, wherein the goose neck portion is flexible and configured to be bent in a shape and maintains the bent shape under an external force, the magnitude of which being below a predetermined value, wherein the lamp portion and the main body portion are configured to form a portable flashlight by engaging each other through the first and second fasteners, wherein the lamp portion and the main body portion are configured to form a light stand by separating from each other and standing on the main body portion, wherein the lamp portion and the main body portion are configured to form a wall lamp by separating from each other and attaching the second fastener of the main body portion to a wall, and wherein the lamp portion and the main body portion are configured to form a ceiling lamp by separating each other and attaching the second fastener of the main body portion to a ceiling, further comprising a docking case including a third fastener on a top surface thereof configured for receiving and holding the second fastener of the main body, wherein the third fastener comprises one or more magnets.

11. The flexible solar light of claim 10, wherein the docking case comprises a fourth fastener on a bottom surface thereof, wherein the fourth fastener is configured to attach the docking case to an external surface.

12. The flexible solar light of claim 10, wherein the docking case further comprises a charging device configured for charging the power supply in the main body portion.

13. The flexible solar light of claim 12, wherein the charging device comprises a solar panel and the power supply comprises a rechargeable battery.

14. The flexible solar light of claim 1, wherein the controller is configured for controlling or displaying the status of the lamp and the power supply.

15. The flexible solar light of claim 1, wherein the lamp comprises a plurality of light-emitting diodes (LEDs).

16. The flexible solar light of claim 1, wherein each of the first and second fasteners comprises a mechanical fastener.

17. The flexible solar light of claim 1, wherein the power supply comprises a power cord and a plug that are configured for using a wall outlet directly.

* * * * *